United States Patent
Moy et al.

(10) Patent No.: US 7,103,720 B1
(45) Date of Patent: Sep. 5, 2006

(54) SHADER CACHE USING A COHERENCY PROTOCOL

(75) Inventors: Simon S. Moy, Los Altos, CA (US); John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 323 days.

(21) Appl. No.: 10/696,714

(22) Filed: Oct. 29, 2003

(51) Int. Cl.
*G06F 12/00* (2006.01)

(52) U.S. Cl. .................. 711/122; 711/144; 345/557

(58) Field of Classification Search ............... None
See application file for complete search history.

(56) References Cited

U.S. PATENT DOCUMENTS

| | | | |
|---|---|---|---|
| 6,178,481 B1 * | 1/2001 | Krueger et al. ............. 711/122 |
| 6,279,086 B1 * | 8/2001 | Arimilli et al. ............. 711/143 |
| 6,397,300 B1 * | 5/2002 | Arimilli et al. ............. 711/138 |
| 6,405,285 B1 * | 6/2002 | Arimilli et al. ............. 711/122 |
| 6,418,513 B1 * | 7/2002 | Arimilli et al. ............. 711/122 |
| 6,434,667 B1 * | 8/2002 | Arimilli et al. ............. 711/122 |
| 6,446,166 B1 * | 9/2002 | Arimilli et al. ............. 711/122 |
| 6,463,507 B1 * | 10/2002 | Arimilli et al. ............. 711/122 |

* cited by examiner

*Primary Examiner*—Reginald G. Bragdon
*Assistant Examiner*—Horace Flournoy
(74) *Attorney, Agent, or Firm*—Patterson & Sheridan, L.L.P.

(57) ABSTRACT

Methods and systems for caching graphics data using dedicated level one caches and a shared level two cache are described. Furthermore, each method includes a protocol for maintaining coherency between the level one caches and between the level one caches and the level two cache. The level one caches may store different versions of the graphics data, permitting simultaneous processing of execution threads, each thread accessing a different version of the graphics data.

19 Claims, 9 Drawing Sheets

US 7,103,720 B1

SHADER CACHE USING A COHERENCY PROTOCOL

FIELD OF THE INVENTION

The present invention generally relates to data processing and, more particularly, to caching data in a multi-threaded streaming processor.

BACKGROUND

Current graphics data processing includes systems and methods developed to perform a specific operation on graphics data. Operations such as geometric transformations are applied to a plurality of graphics primitives and constants used during those operations are conventionally stored in a local memory such as a register file or random access memory (RAM).

FIG. 1 is a block diagram of an exemplary embodiment of a prior art Graphics Processing System 100. An Input 105 includes graphics primitives and commands. A Controller 110 receives the commands, including commands to write constants to a Constant Storage 130, e.g., RAM or a register file. Controller 110 outputs graphics primitives and commands to each Processing Unit 120 and processed graphics primitives are output by each Processing Unit 120 to each Output 125. Each Processing Unit 120 reads the constants from Constant Storage 130 while processing the graphics primitives.

Prior to writing a constant to Constant Storage 130, Controller 110 must obtain exclusive write access to Constant Storage 130 to ensure that a constant is not inadvertently modified before being read by either Processing Unit 120. Therefore, Controller 110 determines that each Processing Unit 120 is idle before writing a constant to Constant Storage 130, blocking a unit providing Input 105 if needed until the constant is modified. Blocking Input 105 reduces the throughput of Graphics Processing System 100. Furthermore, when Processing Units 120 are many pipeline stages deep, one Processing Unit 120 may be idle for many clock cycles before the other Processing Unit 120 completes processing and becomes idle.

Accordingly, it would be desirable to provide improved approaches to updating constants accessed by one or more graphics processing units.

SUMMARY

Various embodiments of a method of the invention include storing a first version of graphics data in a first level 1 cache, storing a second version of graphics data in a second level 1 cache, and storing the first version of graphics data in a level 2 cache.

Various embodiments of the invention include a graphics processing array. The graphics processing array includes a first execution unit configured to process graphics data and including a first level 1 cache, a second execution unit configured to process graphics data and including a second level 1 cache, and a level 2 cache coupled to both the first execution unit and the second execution unit.

The current invention involves new systems and methods for storing and accessing graphics data using dedicated level one caches and a shared level two cache.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 2:
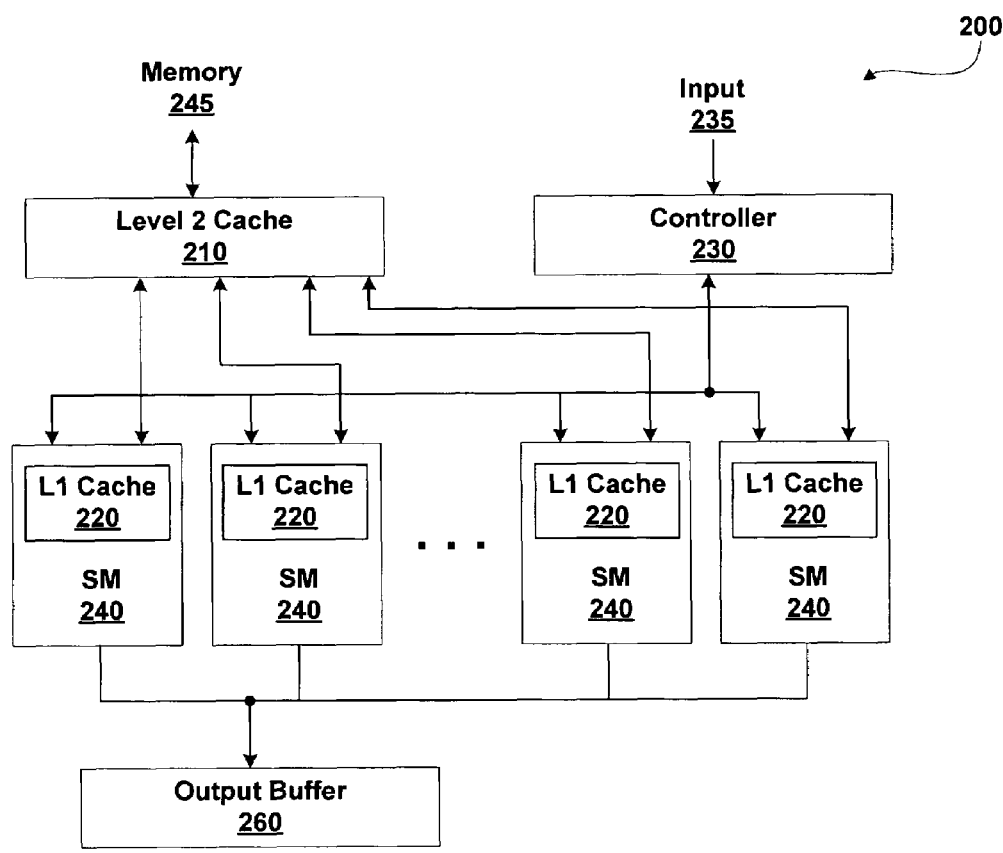
FIG. 2 is a block diagram of an exemplary embodiment of a streaming processing array in accordance with one or more aspects of the present invention.

FIG. 2 is a block diagram of an exemplary embodiment of a Streaming Processing Array (SPA) 200 in accordance with one or more aspects of the present invention. Input 235 includes commands and graphics data such as primitives, vertices, fragments, constants, and the like. In one embodiment an SM 240 may receive first graphics data, such as higher-order surface data, and tessellate the first graphics data to generate second graphics data, such as vertices. An SM 240 may be configured to transform the second graphics data from an object-based coordinate representation (object space) to an alternatively based coordinate system such as world space or normalized device coordinates (NDC) space. SMs 240 output processed graphics data, such as vertices, that are stored in an Output Buffer 260 such as a register file, FIFO, cache, or the like. In alternate embodiments SPA 200 and SMs 240 may be configured to process data other than graphics data.

A Controller 230 writes constants to one or more Level 1 (L1) Caches 220, each L1 Cache 220 within an execution unit, Streaming Multiprocessor (SM) 240. Controller 230 tracks which SMs 240 are active (processing data) and inactive (available to process data). Controller 230 also tracks the state of each L1 Cache 220, including optionally tracking which locations, e.g., cache lines, entries, or the like, within each L1 Cache 220 have been updated via Controller 230 writing a constant to L1 Cache 220.

Figure 1:
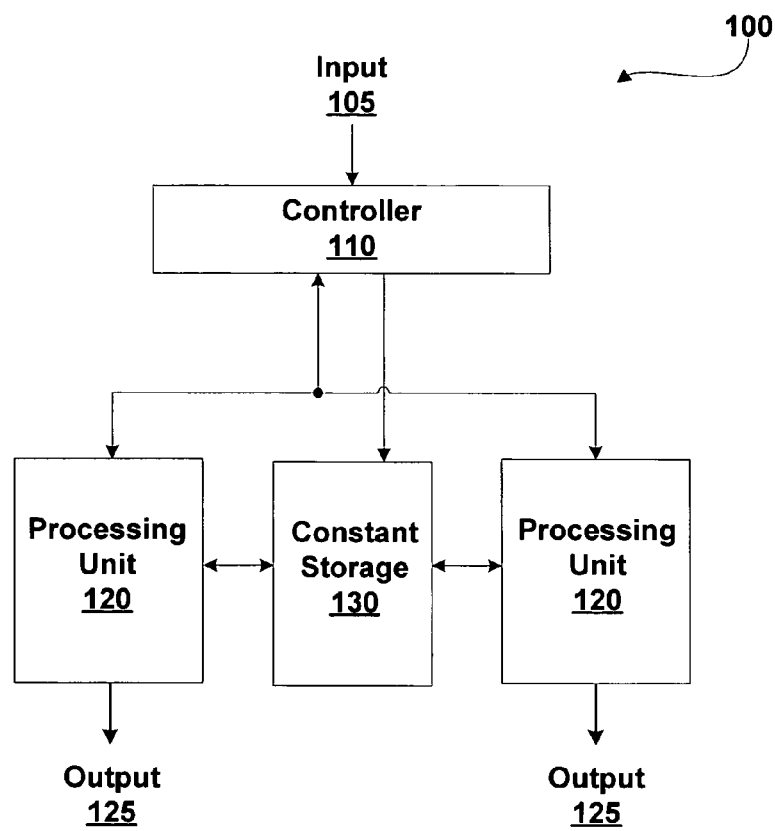
FIG. 1 is a block diagram of an exemplary embodiment of a prior art graphics processing system.

Unlike Processing Units 120 shown in FIG. 1, each SM 240 may be processing graphics data using a different value for a constant because each SM 240 has a dedicated L1 Cache 220. Consequently, each L1 Cache 220 may store a different "version" of constants. A graphics program made up of a sequence of commands (vertex program or shader program) is executed within one or more SMs 240 as a plurality of threads where each vertex or fragment to be processed by the program is assigned to a thread. Although threads share an L1 Cache 220 and processing resources within an SM 240, the execution of each thread proceeds independent of any other threads. In one embodiment each SM 240 processes one thread. In other embodiments each SM 240 processes several or more threads.

A Level 2 (L2) Cache 210 includes the version of constants used by the oldest active thread. Therefore, L2 Cache 210 is coherent with L1 Caches 220 (and corresponding SM 240s) using the same version of constants. When a read request received by L2 Cache 210 from an L1 Cache 220 results in a cache miss, L2 Cache 210 reads the data from a Memory 245 and stores the data. The L1 Cache also stores the data. Memory 245 may include system memory, local memory, or the like. When all SMs 240 using the same version of constants become inactive, L2 Cache 210 is updated to a different, more recent version of constants if a more recent version exists, as described further herein. Similarly, prior to outputting graphics data to an SM 240 for processing, Controller 230 determines if an L1 Cache 220 within an inactive SM 240 needs to be updated to contain a current version of constants. The current version of constants has updated each constant specified by each received constant command.

When a constant is written to a location within an L1 Cache 220 the location is "locked", preventing the location from being overwritten prior to either invalidation of the L1 Cache 220 or moving the constant to L2 Cache 210. If all locations within an L1 Cache 220 are locked and a constant should be replaced in the L1 Cache 220 due to an cache miss in the L1 Cache 220, the SM 210 containing the L1 Cache 220 stalls until the L1 Cache 220 (or another L1 Cache 220) can write the constant to L2 Cache 210, thereby becoming coherent with L2 Cache 210.

Figure 3A:
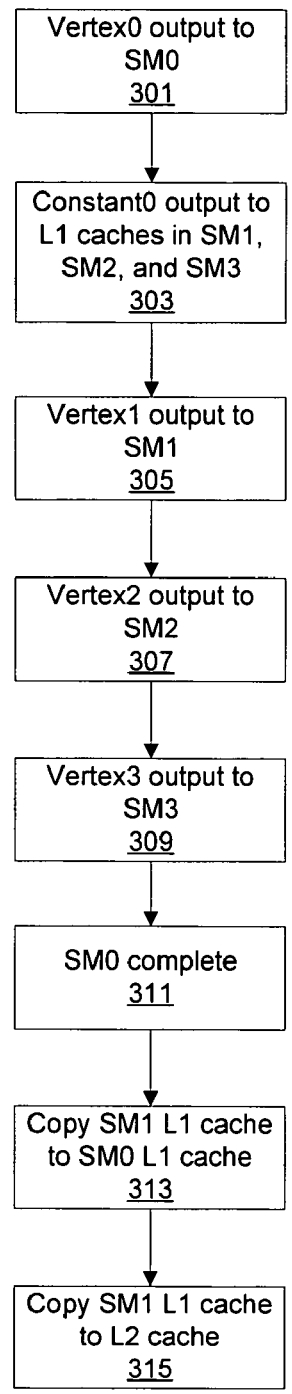
FIGS. 3A and 3B illustrate embodiments of methods of using graphics data caches in accordance with one or more aspects of the present invention.

FIG. 3A illustrates an embodiment of a method of using dedicated Level 1 Caches 220 and shared L2 Cache 210 in accordance with one or more aspects of the present invention. An embodiment of SPA 200 includes four SM 240s, SM0, SM1, SM2, and SM3. In step 301 Controller 230 outputs vertex0 to an inactive SM 240, SM0 for processing and SM0 becomes active. In step 303 Controller 230 outputs constant0 to L1 Caches 220 in SM1, SM2, and SM3. SM0 is using a different version of constants (an old version of constants) compared with the other SM 240s since SM0 did not update constant0. L2 Cache 210 is coherent with L1 Cache 220 in SM0, but is not coherent with the L1 Caches 220 in SM1, SM2, and SM3. L1 Caches 220 in SM1, SM2, and SM3 contain the current version of constants.

In step 305 Controller 230 outputs vertex1 to an inactive SM 240, SM1 for processing and SM1 becomes active. In step 307 Controller 230 outputs vertex2 to an inactive SM 240, SM2 for processing and SM2 becomes active. In step 309 Controller 230 outputs vertex3 to an inactive SM 240, SM3 for processing and SM3 becomes active. SM1, SM2, and SM3 are each using the same version of constants, the current version of constants. In step 311 SM0 completes processing of vertex0 and becomes inactive. In step 313 Controller 230 determines SM0 is inactive. Controller 230 instructs SM1 to copy a portion of graphics data, e.g. one or more constants, stored in the L1 Cache 220 in SM1 from the L1 Cache 220 in SM1 to the L1 Cache 220 in SM0. In one embodiment Controller 230 determines which constants to copy by maintaining dirty bits for each L1 Cache 220. The dirty bits are asserted when a constant is written and cleared when a constant is copied. A dirty bit may correspond to a specific constant, cache entry, cache line, or the like.

In step 315 Controller 230 determines none of the SMs 240 are using the version of constants stored in L2 Cache 210, the old version of constants. Controller 230 instructs SM1 to copy one or more constants from the L1 Cache 220 in SM1 to L2 Cache 210 and all of the SMs 240 are coherent with L2 Cache 210. In this embodiment two versions of constants are simultaneously used within SPA 200 to process graphics data. All of the SMs 240 do not need to be inactive prior to updating a constant stored in an L1 Cache 220, therefore performance is improved compared with an embodiment of SPA 200 with a single shared constant storage.

Figure 3B:
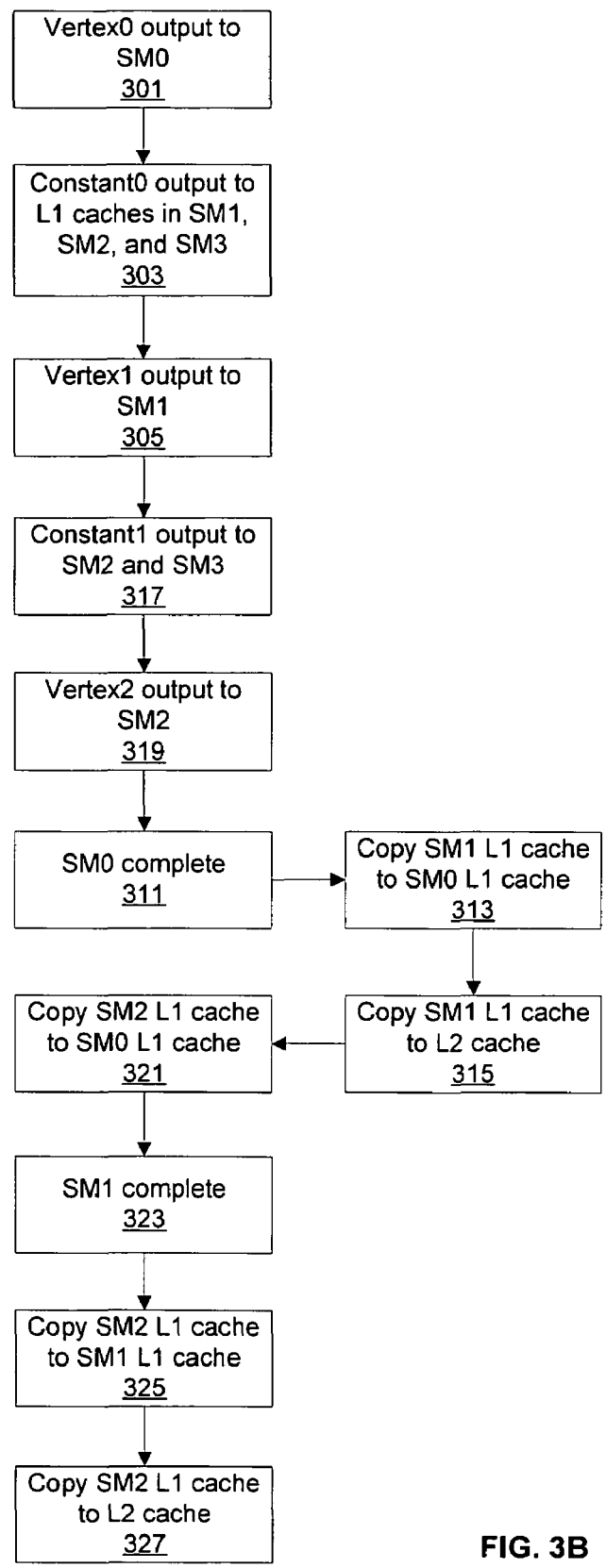

FIG. 3B illustrates an embodiment of a method of using dedicated Level 1 Caches 220 and a shared L2 Cache 210 in accordance with one or more aspects of the present invention. Steps 301, 303, and 305 are completed as previously described in relation to FIG. 3A. L1 Cache 220 in SM0 stores a first version of constants and is coherent with L2 Cache 210. L1 Caches 220 in SM1, SM2, and SM3 store a second version of constants. SM0 and SM1 are active and SM2 and SM3 are inactive.

In step 317 Controller 230 outputs constant1 to L1 Caches 220 in SM2 and SM3. L1 Caches 220 in SM2 and SM3 store a third version of constants. In step 319 Controller 230 outputs vertex2 to SM2 for processing and SM2 becomes active. In step 311 SM0 completes processing of vertex0 and becomes inactive. In step 313 Controller 230 determines SM0 is inactive and the other SMs 240 are not using the first version of constants. Controller 230 instructs SM1 to copy one or more constants from the L1 Cache 220 in SM1 to the L1 Cache 220 in SM0. In step 315 Controller 230 determines none of the SMs 240 are using the version of constants stored in L2 Cache 210, the first version of constants. Controller 230 instructs SM1 to copy one or more constants from the L1 Cache 220 in SM1 to L2 Cache 210 and SM0 and SM1 are coherent with L2 Cache 210, each storing the second version of constants.

In step 321 Controller 230 determines SM0 is not using the current version of constants, the third version of constants stored in L1 Caches 240 in SM2 and SM3. Controller 230 instructs SM2 to copy one or more constants from the L1 Cache 220 in SM2 to the L1 Cache 220 in SM0 and SM0, SM2, and SM3 each store the third version of constants. Only the L1 Cache 220 in SM1 is coherent with L2 Cache 210, each storing the oldest version of constants in use, the second version of constants.

In step 323 SM1 completes processing of vertex1 and becomes inactive. In step 325 Controller 230 determines SM1 is inactive and the other SMs 240 are not using the second version of constants. Controller 230 instructs SM2 to copy one or more constants from the L1 Cache 220 in SM2 to the L1 Cache 220 in SM1. In step 327 Controller 230 determines none of the SMs 240 are using the version of constants stored in L2 Cache 210, the second version of constants. Controller 230 instructs SM2 to copy one or more constants from the L1 Cache 220 in SM2 to L2 Cache 210 and all of the L1 Caches 210 are coherent with L2 Cache 210. In this embodiment more than two versions of constants are simultaneously used within SPA 200 to process graphics data. The number of versions of constants may be equal to the number of SMs 240 within SPA 200. The size of L1 Cache 220 is determined by a typical working set of constants and may be specified by an application programming interface. The size of L2 Cache 210 is larger than the size of L1 Cache 220, however L2 Cache 210 stores the "oldest" version of constants used by at least one SM 240. Consequently, cache misses of L2 Cache 210 result when other versions of constants are requested. As previously mentioned in relation to FIG. 3A, performance is improved compared with an embodiment of SPA 200 with a single shared constant storage.

Figure 4:
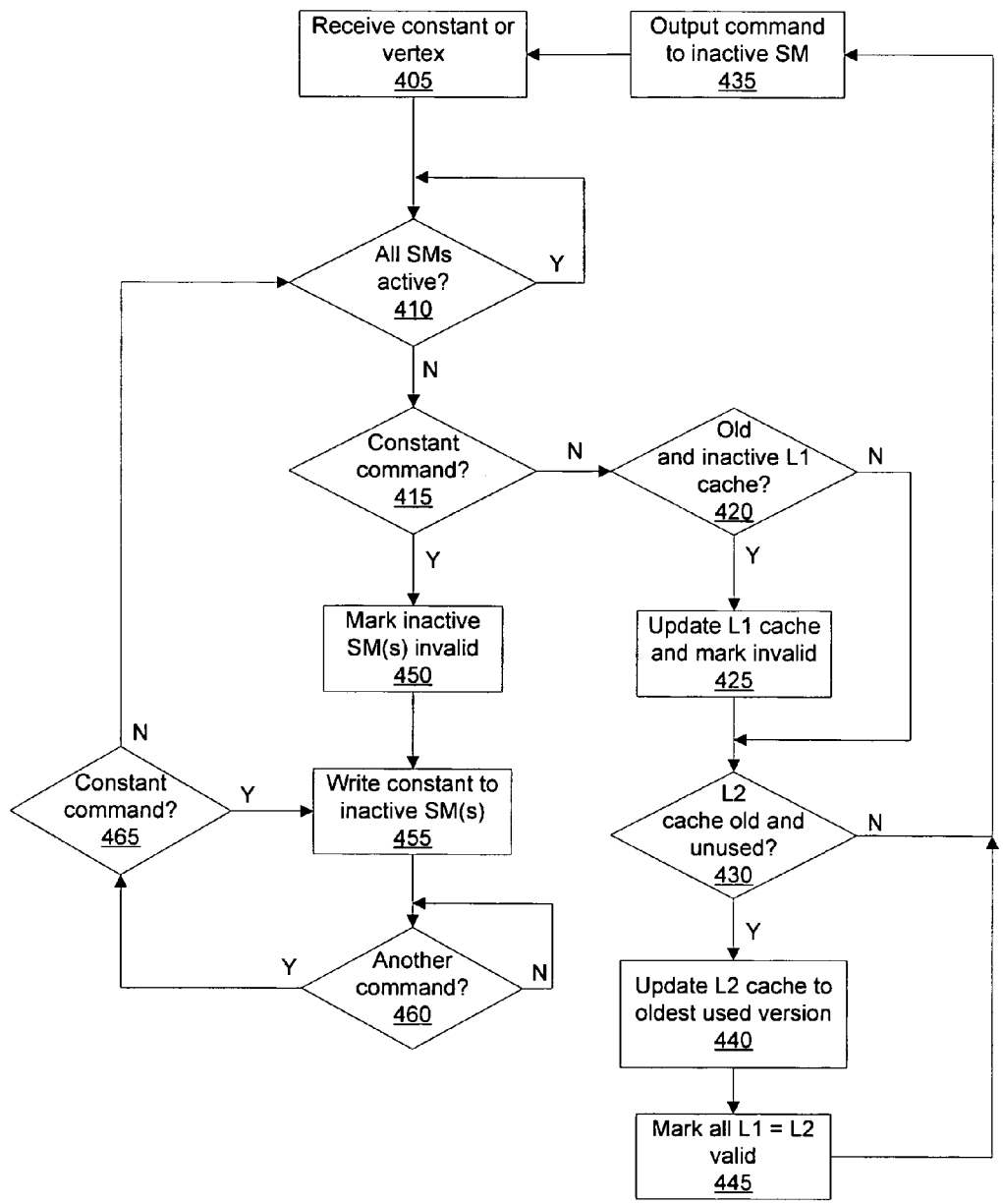
FIG. 4 illustrates an embodiment of a method of using the graphics data caches shown in FIG. 2 in accordance with one or more aspects of the present invention.

FIG. 4 illustrates an embodiment of a method of using SPA 200 shown in FIG. 2 in accordance with one or more aspects of the present invention. This embodiment may be used for any sequence of commands, including constant commands and graphics data processing commands, e.g., vertex commands. This embodiment may also be used with any number of SMs 240. L2 Cache 210 is initialized as invalid. In step 405 Controller 230 receives a constant or vertex command. In step 410 Controller 230 determines if all SMs 240 are active, and, if so Controller 230 repeats step 410. If, in step 410 Controller 230 determines at least one SM 240 is inactive, then in step 415 Controller 230 determines if the command received in step 405 is a constant command, and, if not, in step 420 Controller 230 determines if at least one L1 Cache 220 within an inactive SM 240 does not include the current version of constants, i.e. at least one L1 Cache 220 stores an old version of constants.

If, in step 420 Controller 230 determines at least one L1 Cache 220 within an inactive SM 240 stores an old version of constants, in step 425 Controller updates the at least one L1 Cache 220 to store the current version of constants. For example, Controller 230 copies the current version of constants stored in an L1 Cache 220 within an active SM 240 to each L1 Cache 220 within an inactive SM 240. In step 425 Controller 230 also marks the at least one updated L1 Cache 220 as invalid because the at least one updated L1 Cache 220 is not coherent with L2 Cache 210 and Controller 230 proceeds to step 430. If, in step 420 Controller 230 determines at least one L1 Cache 220 within an inactive SM 240 does not store an old version of constants, then Controller 230 proceeds to step 430.

In step 430 Controller 230 determines if L2 Cache 210 stores an old and unused version of constants, and, if not, Controller 230 proceeds to step 435. A version of constants is unused if an active SM 240 is not using the version of constants stored in L2 Cache 210. If, in step 430 Controller 230 determines L2 Cache 210 stores an old and unused version of constants, then in step 440 Controller 230 updates L2 Cache 210 to the oldest used version of constants. Sometimes the oldest used version of constants is the current version of constants. In one embodiment L2 Cache 210 is updated by copying the oldest used version of constants from an L1 Cache 220 to L2 Cache 210. In some embodiments Controller 230 copies a portion of the oldest used version of constants, determining which constants to copy by maintaining dirty bits for each L1 Cache 220. In step 445 Controller 230 marks each SM 240 including an L1 Cache 220 that stores the same version of constants that is stored in L2 Cache 210 as valid and proceeds to step 435. Marking an L1 Cache 220 within an SM 240 as valid indicates the L1 Cache 220 is coherent with L2 Cache 210. In step 435 Controller 230 outputs the command received in step 405 to an inactive SM 240 for processing and the inactive SM 240 becomes active.

If, in step 415 Controller 230 determines the command received in step 405 is a constant command, then in step 415 Controller 230 marks all inactive SMs 240 as invalid because each L1 Cache 220 within an inactive SM 240 will receive the constant command. Therefore, each L1 Cache 220 within an inactive SM 240 will not be coherent with L2 Cache 210. In step 455 Controller 230 writes the constant included in the constant command to each L1 Cache 220 within an inactive SM 240. In step 460 Controller 230 determines if another command is available at Input 235, and, if not, Controller repeats step 460. If, in step 460 Controller 230 determines another command is available at Input 235, then in step 465 Controller 230 determines if the command is a constant command. If, in step 465 Controller 230 determines the command is a constant command, then Controller 230 returns to step 455. Otherwise, Controller 230 returns to step 410.

Figure 5:
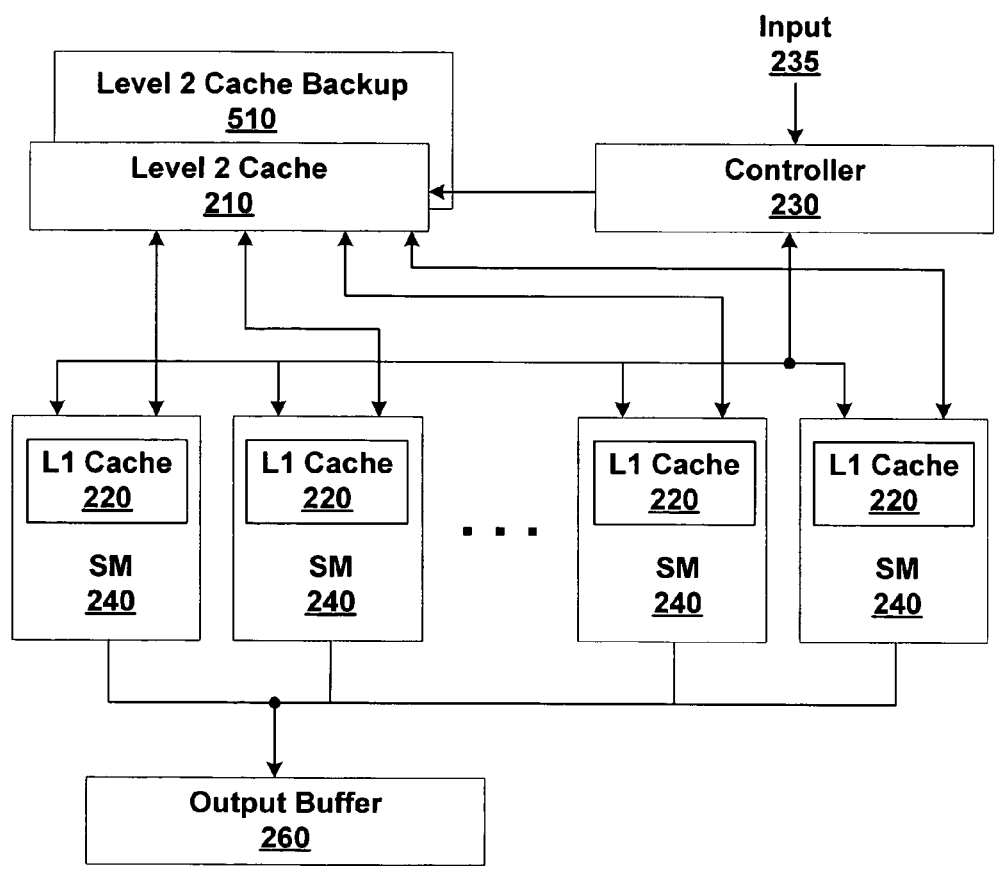
FIG. 5 is a block diagram of an exemplary embodiment of a streaming processing array in accordance with one or more aspects of the present invention.

FIG. 5 is a block diagram of an exemplary embodiment of a SPA 200 in accordance with one or more aspects of the present invention. In this embodiment, SPA 200 includes a Level 2 (L2) Cache Backup 510 for storing older versions of constants. Instead of storing the oldest version of constants in use by an active SM 240, L2 Cache 210 stores the current version of constants. When a constant command is received by Controller 230, Controller 230 copies a constant from L2 Cache 210 to L2 Cache Backup 510 if there is an active SM 240 that SM 240 may need to use an old constant that is being replaced by the current constant included in the constant command. When all of the locations in L2 Cache Backup 510 have been written with constants that are in use and Controller 230 needs to copy a constant from L2 Cache 210 to L2 Cache Backup 510, Controller 230 stalls until a location in L2 Cache Backup 510 becomes available.

In this embodiment when an SM 240 becomes inactive the L1 Cache 220 within the SM 240 is invalidated unless the constants in L1 Cache 220 are the same version as L2 Cache 210. Therefore, L1 Caches 220 are not updated by copying constants from one L1 Cache 220 to another L1 Cache 220. Because L2 Cache 210 always contains the most recent version of constants L2 Cache 210 is not updated from an L1 Cache 220. L1 Caches 220 only read L2 Cache 210 and L1 Caches 220 are updated to the current version of constants by copying one or more constants from L2 Cache 210. Consequently, the interfaces and interactions between SMs 240 and L2 Cache 210 and between SMs 240 and Controller 230 are less complex than the embodiment of SPA 200 shown in FIG. 2. However, each read request from an L1 Cache 220 to L1 Cache 210 includes a version tag, specifying the version of constants used in the SM 240 and stored in the L1 Cache 210 within the SM 240.

In some embodiments each SM 240 includes a version tag that is initialized to zero. L2 Cache 210 also includes a version tag that is initialized to zero and L2 Backup Cache 510 includes one or more version tags that are initialized to zero. When a sequence of constant load commands is received each version tag in an active SM 240 is incremented and each version tag in an inactive SM 240 remains unchanged. Each L1 Cache 220 within an inactive SM 240 is loaded with the constants in the sequence of constant commands.

Figure 6:
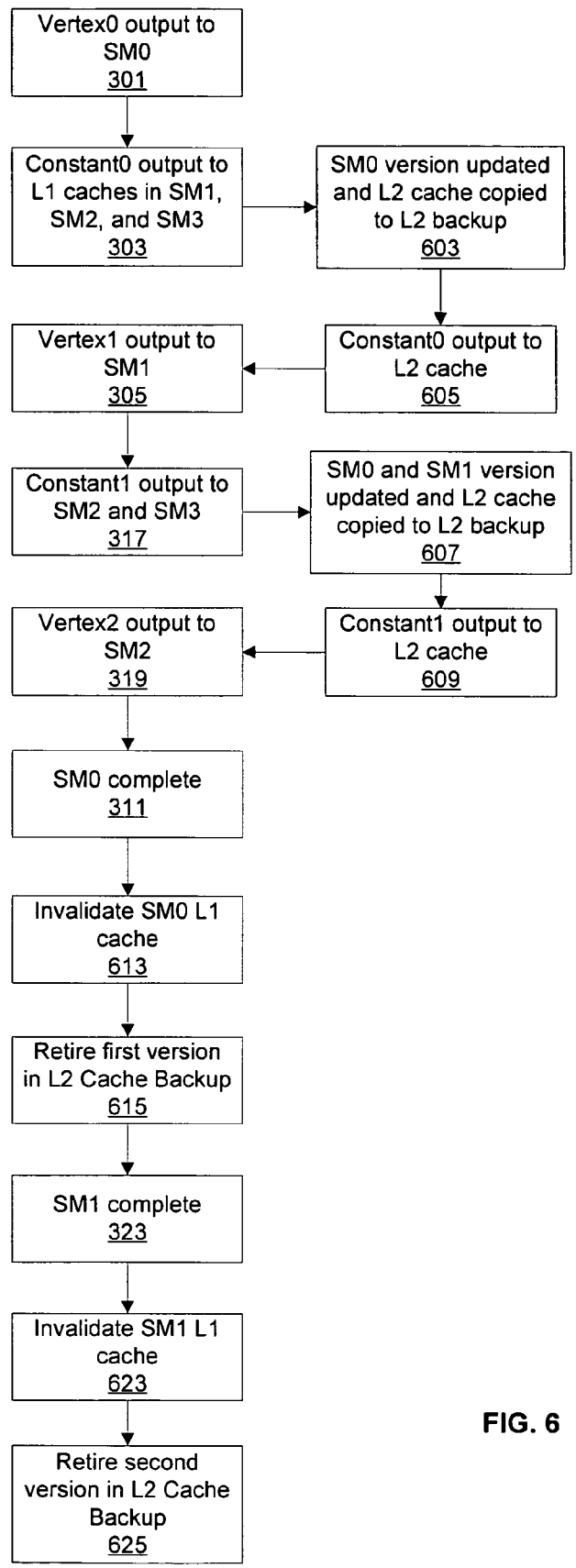
FIG. 6 illustrates an embodiment of a method of using graphics data caches including a level 2 cache with backup in accordance with one or more aspects of the present invention.

FIG. 6 illustrates an embodiment of a method of using dedicated Level 1 Caches 220 and a shared L2 Cache 210 including an L2 Backup Cache 51b in accordance with one or more aspects of the present invention. An embodiment of SPA 200 includes four SM 240s, SM0, SM1, SM2, and SM3. In step 301 Controller 230 outputs vertex0 to an inactive SM 240, SM0 for processing and SM0 becomes active. In step 303 Controller 230 outputs constant0 to L1 Caches 220 in SM1, SM2, and SM3. SM0 is using an older version of constants (a first version of constants) than the other SMs 240 because SM0 did not receive constant0. In step 603 the version tag in SM0 is incremented and Controller 230 and copies the first version of constants to L2 Cache Backup 510. The version tag stored in L2 Cache 210 is updated, e.g., incremented, and copied with the first version of constants to L2 Cache Backup 510. In an alternate embodiment, Controller 230 copies a portion, e.g. a cache entry, a cache line, or the like, of the first version of constants to L2 Cache Backup 510.

In step 605 Controller 230 outputs constant0 to L2 Cache 210. L2 Cache 210 is coherent with the L1 Caches 220 in SM1, SM2, and SM3, but is not coherent with the L1 Cache 220 in SM0. In step 305 Controller 230 outputs vertex1 to an inactive SM 240, SM1 for processing and SM1 becomes active. In step 317 Controller 230 outputs constant1 to L1 Caches 220 in SM2 and SM3. L1 Caches 220 in SM2 and SM3 store a third version of constants. In step 319 Controller 230 outputs vertex2 to SM2 for processing and SM2 becomes active. In step 311 SM0 completes processing of vertex0 and becomes inactive. In step 607 the version tags in SM0 and SM1 are updated and Controller 230 copies the second version of constants to L2 Cache Backup 510. The version tag stored in L2 Cache 210 is updated and copied with the second version of constants to L2 Cache Backup 510. In step 609 Controller 230 outputs constant1 to L2 Cache 210. L2 Cache 210 is coherent with the L1 Caches 220 in SM2, and SM3, but is not coherent with the L1 Caches 220 in SM0 and SM1.

In step 319 Controller 230 outputs vertex2 to SM2 for processing and SM2 becomes active. In step 311 SM0 completes processing of vertex0 and becomes inactive. In step 613 Controller 230 determines SM0 is inactive and the other SMs 240 are not using the first version of constants and Controller 230 invalidates the L1 Cache 220 in SM0 and clears the version tag in SM0 to zero, corresponding to the version tag of the third version of constants. In step 615 Controller 230 retires any locations in L2 Cache Backup 510 containing a portion of the first version of constants. In step 311 SM0 completes processing of vertex0 and becomes inactive. In step 323 SM1 completes processing of vertex1 and becomes inactive. In step 623 Controller 230 determines SM0 is inactive and the other SMs 240 are not using the second version of constants and Controller 230 invalidates the L1 Cache 220 in SM1 and clears the version tag in SM1 to zero, corresponding to version tag of the third version of constants. In step 625 Controller 230 retires any locations in L2 Cache Backup 510 containing a portion of the second version of constants.

For embodiments of SPA 200 as shown in FIG. 5, the number of versions of constants may be as great as the number of SMs 240 within SPA 200. The size of L1 Cache 220 is determined by a typical working set of constants and may be specified by an application programming interface. The size of L2 Cache 210 may be large enough to hold additional number of constants beyond the number of constants in a typical working set, however, unlike the L2 Cache 210 shown in FIG. 2, the L2 Cache 210 shown in FIG. 5 stores the current version of constants. L2 Cache Backup 510 stores any other version of constants used by at least one SM 240. L2 Cache Backup 510 may be sized to minimize cache misses when non-current versions of constants are requested by an SM 240.

Figure 7:
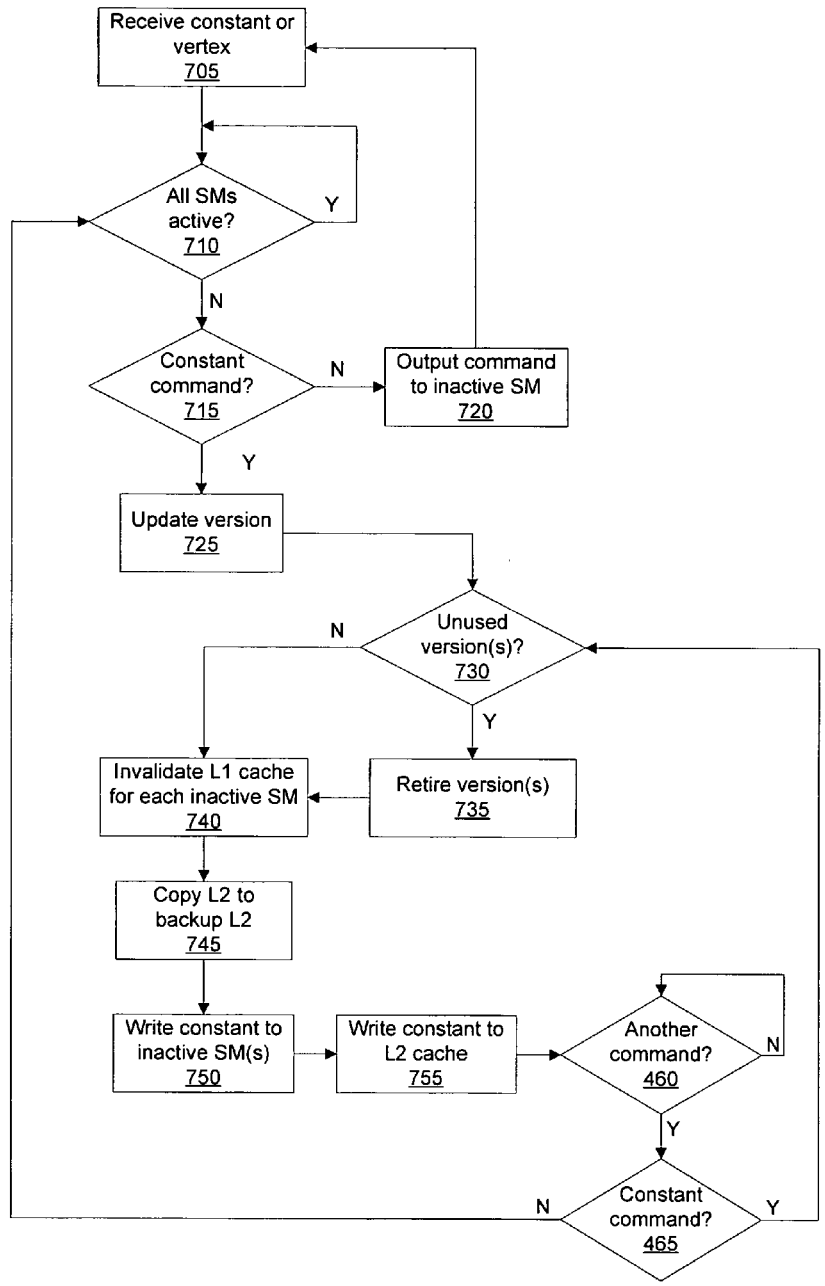
FIG. 7 illustrates an embodiment of a method of using graphics data caches shown in FIG. 5 in accordance with one or more aspects of the present invention.

FIG. 7 illustrates an embodiment of a method of using dedicated Level 1 Caches 220 and a shared L2 Cache 210 including an L2 Backup Cache 510 as shown in FIG. 5 in accordance with one or more aspects of the present invention. This embodiment may be used for any sequence of commands, including constant commands and graphics data processing commands, e.g., vertex commands. This embodiment may also be used with any number of SMs 240. In step 705 Controller 230 receives a constant or vertex command. In step 710 Controller 230 determines if all SMs 240 are active, and, if so Controller 230 repeats step 710.

If, in step 710 Controller 230 determines all SMs 240 are not active, then in step 715 Controller 230 determines if the command received in step 705 is a constant command, and, if not, then in step 720 Controller 230 outputs the command to an inactive SM 240 for processing and the SM 240 becomes active. If, in step 715 Controller 230 determines the command received in step 705 is a constant command, then in step 725 version tags of active SMs 240 are updated. The active SMs 240 will proceed using one or more older versions of the constants and inactive SMs 240 and L2 Cache 210 will receive at least one constant command.

In step 730 Controller 230 determines if L2 Cache Backup 510 is storing any unused versions of constants. An unused version of constants is not used by any active SM 240, therefore the version tag corresponding to the unused version of constants does not match the version tag of constants used by any active SM 240. If, in step 730 Controlller 230 determines L2 Cache Backup 510 is storing at least one unused version of constants, then in step 735 the at least one unused version of constants is retired and at least one cache location is available for allocation to another constant and Controller 230 proceeds to step 740. If, in step 730 Controller 230 determines L2 Cache Backup 510 is not storing at least one unused version of constants, then in step 740 Controller 230 invalidates each L1 Cache 220 within an inactive SM 240 and clears the version tag associated with each inactive SM 240 to zero.

In step 745 Controller 230 copies (or moves) the constant stored the location in L2 Cache 210 to be written by the constant command received in step 705 from the location in L2 Cache 210 to a location in L2 Cache Backup 510. The version tag stored in L2 Cache 210 is updated and copied with the constant to L2 Cache Backup 510. Controller 230 associated the location in L2 Cache Backup 510 with the version of the constant. In step 750 Controller 230 outputs the constant command received in step 705 to all inactive SMs 240. In step 755 Controller 230 outputs the constant command to L2 Cache 210. In step 760 Controller 230 determines if another command is available, and, if not, Controller 230 repeats step 760. If, in step 760 Controller 230 determines another command is available, then in step 765 Controller 230 determines if the command is a constant command, and, if not, Controller 230 returns to step 710. Otherwise Controller 230 returns to step 730.

Figure 8:
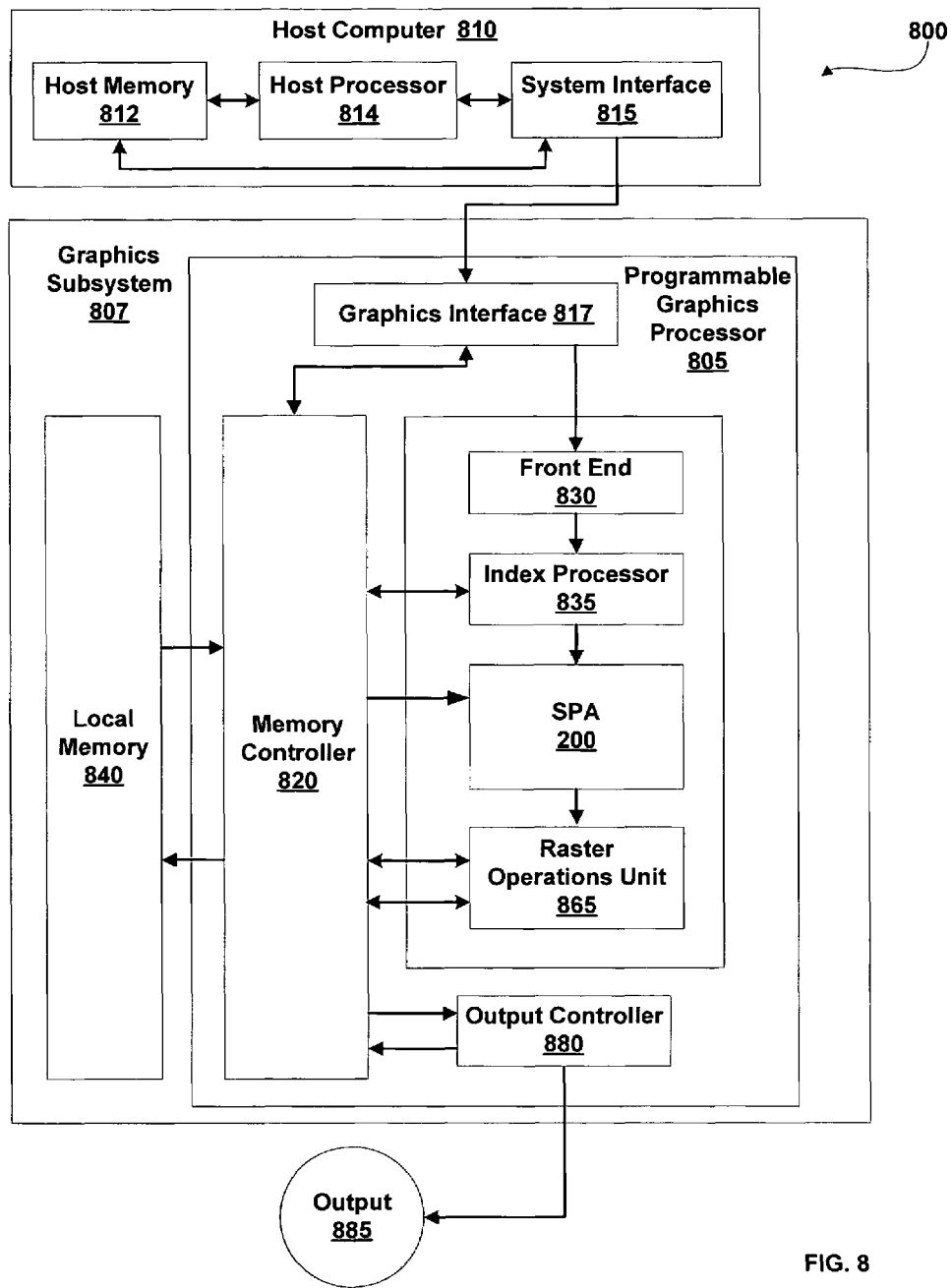
FIG. 8 is a block diagram of an exemplary embodiment of a computing system including a streaming processing array in accordance with one or more aspects of the present invention.

FIG. 8 is a block diagram of an exemplary embodiment of a Computing System 800 including a SPA 200 in accordance with one or more aspects of the present invention. Computing System 800 includes a Host Computer 810 and a Graphics Subsystem 807. Computing System 800 may be a desktop computer, server, laptop computer, palm-sized computer, tablet computer, game console, cellular telephone, computer based simulator, or the like. Host computer 810 includes Host Processor 814 that may include a system memory controller to interface directly to Host Memory 812 or may communicate with Host Memory 812 through a System Interface 815. System Interface 815 may be an I/O (input/output) interface or a bridge device including the system memory controller to interface directly to Host Memory 812.

Host Computer 810 communicates with Graphics Subsystem 870 via System Interface 815 and a Graphics Interface 817 within a Graphics Processor 805. Data received at Graphics Interface 817 can be passed to a Front End 830 within a Graphics Processing Pipeline 803 or written to a Local Memory 840 through Memory Controller 820. Front End 830 also receives commands from Host Computer 810 via Graphics Interface 817. Front End 830 interprets and formats the commands and outputs the formatted commands and graphics data to an Index Processor 835. Some of the formatted commands, e.g., constant commands, vertex commands, and the like, are used by SPA 200 to initiate processing of graphics data. Commands may provide the location of program instructions or graphics data stored in graphics memory. Index Processor 835, SPA 200 and Raster Operations Unit 865 each include an interface to Memory Controller 120 through which program instructions or graphics data may be read from graphics memory. Graphics memory may include portions of Host Memory 812, Local Memory 840 directly within Graphics Subsystem 807, register files coupled to the computation units within Programmable Graphics Processor 805, and the like.

Index Processor 835 optionally reads processed data, e.g., data written by Raster Operations Unit 865, from graphics memory and outputs the graphics data, processed graphics data and formatted commands to SPA 200. SPA 200 contains one or more execution units, such as SM 240, to perform a variety of specialized functions. Some of these functions are table lookup, scalar and vector addition, multiplication, division, coordinate-system mapping, calculation of vector normals, tessellation, calculation of derivatives, interpolation, and the like.

Processed graphics data output by SPA 200 are passed to Raster Operations Unit 865, which performs near and far plane clipping and raster operations, such as stencil, z test, and the like, and saves the results in graphics memory. When the graphics data received by Graphics Subsystem 870 has been completely processed by Graphics Processor 805, an Output 885 of Graphics Subsystem 870 is provided using an Output Controller 880. Output Controller 880 is optionally configured to deliver processed graphics data to a display device, network, electronic control system, other Computing System 800, other Graphics Subsystem 870, or the like. In alternate embodiments Graphics Processing Pipeline 803 includes additional computation units coupled in parallel or in series with the computation units shown in FIG. 8. For example, an additional SPA 200 may be included in parallel or in series with SPA 200. Alternatively, a rasterization unit may be coupled to SPA 200 to scan convert primitives output by SPA 200 and produce fragments as input to SPA 200.

The invention has been described above with reference to specific embodiments. Persons skilled in the art will recognize, however, that various modifications and changes may be made thereto without departing from the broader spirit and scope of the invention as set forth in the appended claims. Specifically, the methods and systems described may be used for caching data other than graphics data where the data is used by a streaming multiprocessor capable of processing several execution threads. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

All trademarks are the respective property of their owners.

The invention claimed is:

1. A method for caching versions of constants for use by a plurality of execution units executing threads, comprising:
   storing a first version of a constant in a first level 1 cache together with a version tag for use by a first one of the execution units;
   storing a second version of a constant in a second level 1 cache together with a version tag for use by a second one of the execution units;
   storing one of the first and second versions of a constant together with an updated version tag in a level 2 cache when one of the execution units requests a constant not available in one of the level 1 caches; and
   updating the version tag with the constant in the level 2 cache to indicate the constant is associated with the oldest active thread.

2. The method according to claim 1, further comprising invalidating the second level 1 cache when the version of a constant is transferred to a level 2 cache.

3. The method according to claim 1, further comprising copying a constant from a location in the level 2 cache to a location in a level 2 cache backup when the constant stored in the level 2 cache is not in use by any execution unit.

4. A method as claimed in claim 1, including locking a level 1 cache storing one of the constants until utilization of the locked constant is completed by the execution unit associated therewith.

5. A method as claimed in claim 4, including moving the constant in the locked one of the level 1 caches to another level 1 cache, and unlocking the locked level 1 cache.

6. A method as claimed in claim 1, including locking a level 1 cache storing one of the constants until the stored constant is moved to the level 2 cache.

7. A method as claimed in claim 1, wherein each of the level 1 caches is associated with and accessed by a single one of the execution units, and the level 2 cache is associated with and directly accessed by a plurality of the execution units.

8. The method according to claim 7, further comprising copying a constant from a location in the level 2 cache to a location in a level 2 cache backup when the constant stored in the level 2 cache is not in use by any execution unit.

9. A method as claimed in claim 8, including locking a level 1 cache storing one of the constants until the stored constant is moved to the level 2 cache.

10. A method as claimed in claim 1, wherein a number of versions of constants stored is equal to the number of execution units.

11. A streaming processing array, comprising:
   a first execution unit configured to process data and including a first level 1 cache adapted to store a constant and an associated version tag for use by the first execution unit;
   a second execution unit configured to process data and including a second level 1 cache and adapted to store a constant and an associated version tag for use by the second execution unit; and
   a level 2 cache coupled to both the first execution unit and the second execution unit for storing the constants transferred from the first and second level 1 caches when one of those caches must respond to a request for a constant by an associated execution unit, the version tag being updated by a controller configured to associate and update a version tag with the constant stored in each location in the level 2 cache, the constants stored in the level 2 cache being directly accessible by any one of the first and second execution units.

12. The streaming processing array of claim 11, further comprising a level 2 cache backup coupled to the level 2 cache, the level 2 cache being configured to output a constant to the level 2 cache backup responsive to the controller.

13. The streaming processing array of claim 11, wherein the controller is configured to retire a location in the level 2 cache backup when a version tag associated with the constant stored in the location is no longer being used by one of the execution units.

14. The streaming processing array of claim 11, wherein the first level 1 cache is configured to output constants to and to receive constants from the second level 1 cache.

15. The streaming processing array of claim 11, wherein the streaming processing array resides within a programmable graphics processor coupled to a host computer, the processor being configured to control and output requests for constants to the execution units.

16. A streaming processing array as claimed in claim 11, the controller being adapted to lock the level 1 cache storing one of the constants until the stored constant is moved to the level 2 cache.

17. A streaming processing array as claimed in claim 16, the controller being adapted to move the constant in the locked one of the level 1 caches to another level 1 cache, and unlock the locked level 1 cache.

18. A streaming processing array as claimed in claim 11, wherein each of the level 1 caches is associated with and accessed by a single one of the execution units and the level 2 cache is associated with and directly accessed by a plurality of the execution units.

19. A streaming processing array as claimed in claim 11, wherein a number of versions of constants stored is equal to the number of execution units.

* * * * *

UNITED STATES PATENT AND TRADEMARK OFFICE
CERTIFICATE OF CORRECTION

PATENT NO. : 7,103,720 B1 Page 1 of 1
APPLICATION NO. : 10/696714
DATED : September 5, 2006
INVENTOR(S) : Simon S. Moy and John Erik Lindholm It is certified that error appears in the above-identified patent and that said Letters Patent is hereby corrected as shown below:

In Column 10, Claim 2, Line 22, delete "second" and insert --a--.

Signed and Sealed this

Twenty-second Day of May, 2007

JON W. DUDAS
*Director of the United States Patent and Trademark Office*